United States Patent [19]

Townsend

[11] 4,292,710
[45] Oct. 6, 1981

[54] MEMBRANE SKINNER

[75] Inventor: Ray T. Townsend, Des Moines, Iowa

[73] Assignee: Townsend Engineering Company, Des Moines, Iowa

[21] Appl. No.: 95,621

[22] Filed: Nov. 19, 1979

[51] Int. Cl.³ .............................................. A22B 5/16
[52] U.S. Cl. .......................................... 17/21; 99/589
[58] Field of Search ......................... 17/21, 62; 99/589

[56] References Cited

U.S. PATENT DOCUMENTS 3,513,893  5/1970  Townsend ......................... 17/62 X
3,769,903  11/1973  Greider ............................. 17/62 X

FOREIGN PATENT DOCUMENTS 2747253  6/1978  Fed. Rep. of Germany .......... 17/62

Primary Examiner—Willie G. Abercrombie
Attorney, Agent, or Firm—Zarley, McKee, Thomte, Voorhees & Sease

[57] ABSTRACT

A membrane skinning machine comprising a frame with a conveyor mounted thereon, and gripping roll rotatably mounted across one end of the conveyor to receive the product to be skinned. A concave shoe with a cutting blade is mounted generally concentrically with the gripping roll. A skin stripper roll is mounted on the frame adjacent the gripper roll. The gripper roll has a plurality of parallel helical serrations or grooves on its outer surface.

4 Claims, 3 Drawing Figures

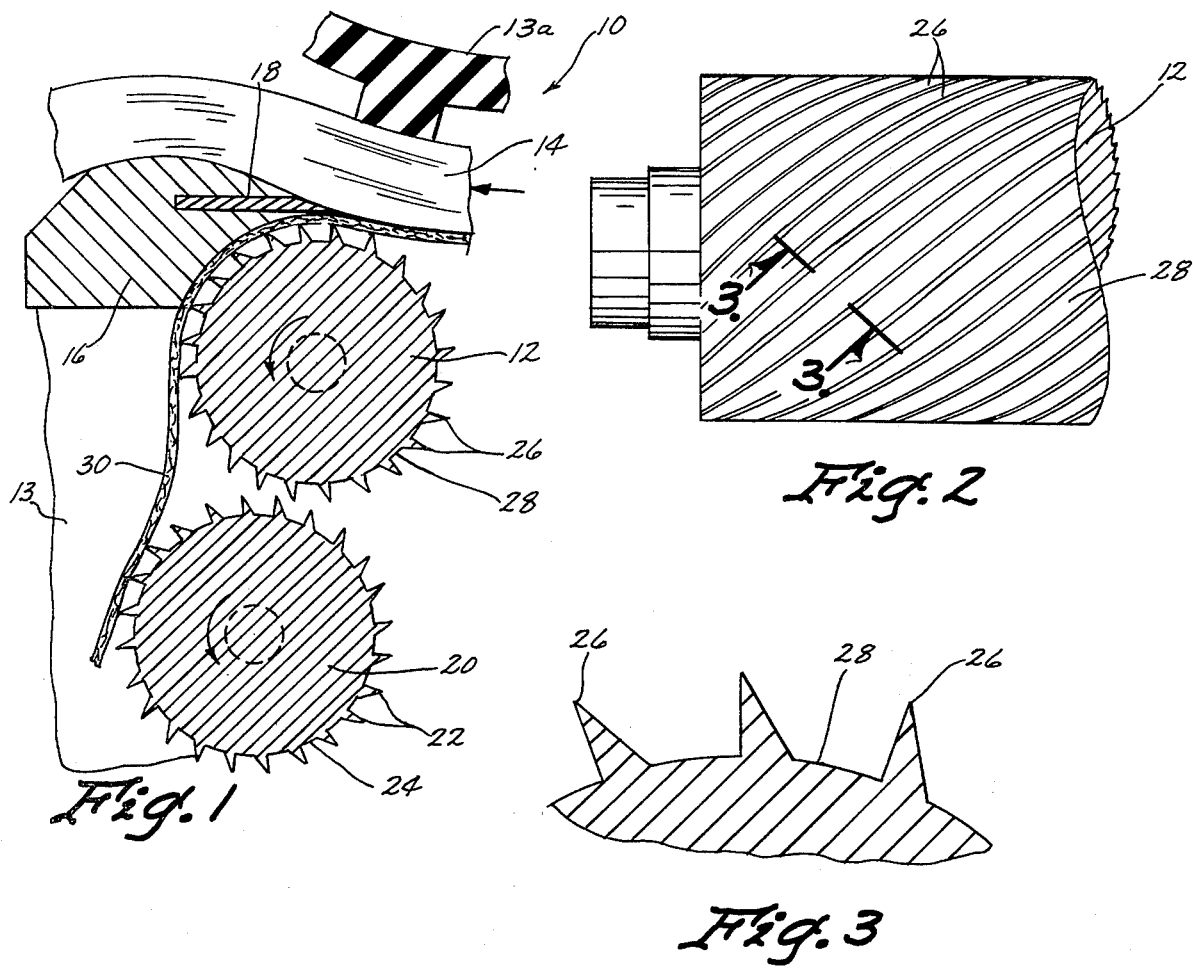

MEMBRANE SKINNER

BACKGROUND OF THE INVENTION

Membrane skinners adapted to remove the thin membranes from steak, or skinners adapted to remove the skin from fish, have long been in use. These machines are distinguished in the trade from pork skinners, for example, which remove a much thicker layer of skin from pork bellies, although the two types of skinners are similar in construction. The gripper rolls of prior membrane skinners usually have a plurality of straight serrations on the surface thereof which are parallel to the axis of the roll. A stripper roll with either straight or helically disposed serrations is disposed adjacent the gripper roll to remove the separated membrane or skin from the gripper roll. See U.S. Pat. No. 3,513,893 issued May 26, 1970, for example. One of the problems created by the conventional structure of the prior art is that fat and other meat particles lodge between the serrations of the gripper roll during the membrane removal process. It is therefore necessary to subject the gripper roll to air or water jets to remove these particles. The use of the air or water jets adds to the expense of the machine, and the water disposal process creates further problems.

SUMMARY OF THE INVENTION

As indicated heretofore, the cleaning of the gripper roll of a membrane skinner creates substantial problems. The principal object of this invention is to provide a membrane skinner wherein the gripper roll thereof is self-cleaning. This is achieved by creating a plurality of parallel helically disposed serrations on the surface of the gripper roll. The wiping action which then takes place between the gripping roll, the meat and the shoe serves to push the fat out of the grooves between the helical serrations as the fat begins to accumulate. The conventional stripper roll enhances the operation by dislodging the fat particles as they are extruded from the grooves. The above described phenomenon results in a gripper roll that is self cleaning.

BRIEF DESCRIPTION OF THE DRAWINGS

FIG. 1 is a longitudinal sectional view through the membrane machine;

FIG. 2 is a partial plan view of the gripper roll shown at an enlarged scale; and FIG. 3 is a sectional view of the gripper roll surface taken on line 3—3 of FIG. 2.

DESCRIPTION OF THE PREFERRED EMBODIMENT

The membrane skinner 10 can include most of the conventional skinner machine components shown in U.S. Pat. No. 3,513,893, except for the construction of the gripper roll 12 which is rotatably mounted on a frame 13 and powered by a suitable power source. A conventional hold down roller 13a maintains the meat product 14 in intimate contact with the gripper roll 12, concave shoe 16 and the cutting blade 18. A conventional stripper roll 20 is also rotatably mounted on the frame and is powered to rotate in the same direction and at a faster speed than the gripper roll 12. The conventional stripper roll 20 has a plurality of parallel serrations 22 and grooves 24 which can be either axially or helically disposed.

The essence of this invention dwells in the discovery that helically disposed serrations 26 with intermittent grooves 28 on the surface of the gripper roll 12 result in a wiping action with the meat product 14, membrane 30, and shoe 16 to create a gripping roll which is self-cleaning. As the fat begins to build up in grooves 28, the wiping action tends to push the built-up fat along and out of the grooves. The stripper roll 20 engages and dislodges any built-up fat that clings to the gripper roll.

As a result, the gripper roll is self-cleaning, and the air and water jets used to clean the membrane skinners of the prior art are no longer required. Thus, this invention achieves its principal objective.

What is claimed is:

1. A membrane skinning machine comprising,
a frame,
a gripper roll mounted on said frame,
a shoe element mounted on said frame adjacent said gripper roll, said shoe element having a concave surface complementary to the surface of said gripper roll,
a cutting blade mounted in said shoe and extending along said gripper roll, and
a plurality of helically disposed serrations on the surface of said gripper roll.

2. The device of claim 1 wherein a stripper roll is rotatably mounted on said frame adjacent said stripper roll.

3. The device of claim 1 wherein said serrations are of continuous construction.

4. The device of claim 2 wherein said serrations are of continuous construction.

* * * * *

UNITED STATES PATENT AND TRADEMARK OFFICE
CERTIFICATE OF CORRECTION

PATENT NO. : 4,292,710

DATED : October 6, 1981

INVENTOR(S) : Ray T. Townsend

It is certified that error appears in the above-identified patent and that said Letters Patent is hereby corrected as shown below:

In column 2, line 44, (claim 2, line 2), change "stripper" to --gripper--.

Signed and Sealed this

First Day of May 1984

[SEAL]

Attest:

Attesting Officer

GERALD J. MOSSINGHOFF

Commissioner of Patents and Trademarks